Patented Mar. 3, 1936

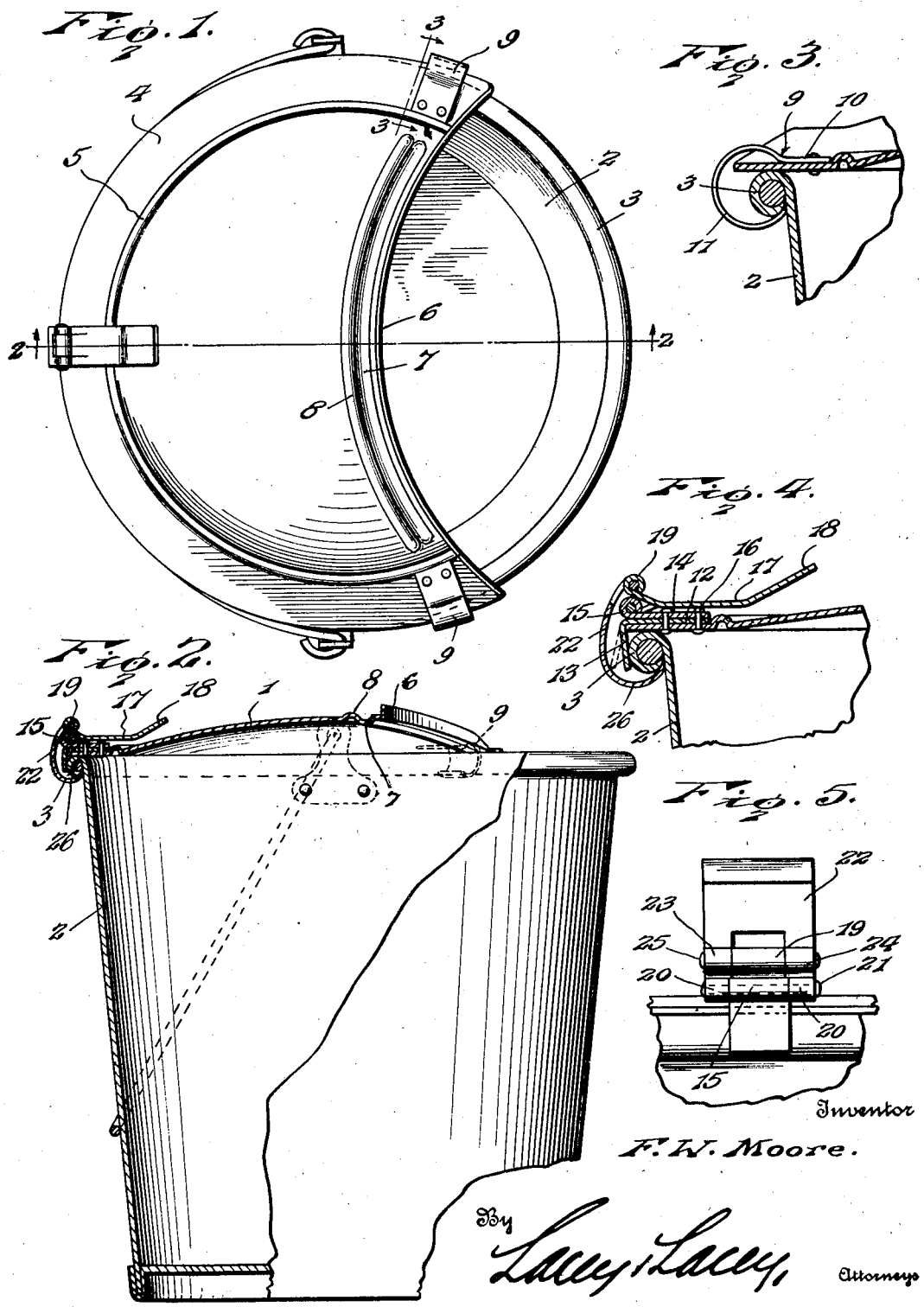

2,032,375

UNITED STATES PATENT OFFICE 2,032,375

MILK PAIL COVER

Frank W. Moore, Lennon, Mich.

Application April 21, 1933, Serial No. 667,276

3 Claims. (Cl. 31—50)

This invention relates to an improved milk pail cover and seeks, among other objects, to provide a device of this character which is particularly adapted for use when milking and is intended for protecting the clothes of the milker from spattering during the milking operation.

Another object of the invention is to provide a milk pail cover wherein a bead is employed so that if excess milk drips on the cover, such milk will be conducted over the edge of the pail and to the ground without coming in contact with and soiling the milker's clothes.

Another object of the invention is to provide a milk pail cover wherein means are employed for effectually retaining said cover in position on a pail so that accidental displacement of the cover from the pail will be prevented.

A further object of the invention is to provide a device of this character which may be readily removed from the pail for purposes of sterilization so that danger of contamination of the contents of the pail will be reduced to a minimum.

A still further object of the invention is to provide a milk pail cover which will be of simple and very rugged construction so that it will retain its shape.

A still further object of the invention is to provide a milk pail cover wherein the latch employed may be quickly engaged and disengaged from the rim of a pail.

It is believed that other objects will be apparent upon further reading of the following description.

In the drawing forming a part of my application,

Figure 1 is a top plan view showing my device as it would appear installed on a pail, Figure 2 is a vertical sectional view of my device on a pail, the view being taken on the line 2—2 of Figure 1, looking in the direction indicated by the arrows, Figure 3 is an enlarged fragmentary vertical sectional view taken on the line 3—3 of Figure 1, looking in the direction indicated by the arrows, Figure 4 is an enlarged fragmentary vertical sectional view of the latch employed, and Figure 5 is an enlarged fragmentary plan view showing the latch as it would appear in disengaged position.

Referring now more particularly to the drawing, it will be seen that my pail cover includes a preferably sheet metal plate 1 which is substantially crescent shaped and is adapted to cover the major portion of a pail 2, which pail is provided with a rolled bead 3 at its upper rim. As best seen in Figure 2 of the drawing, the plate 1 is dished upwardly to assume a substantially concavo-convex cross section throughout the greater portion of its diameter. The plate 1 is provided with a flat margin 4 and connecting the margin with the concavo-convex portion is a raised bead 5. The flat margin is adapted closely to overlie the upper extremity of the bead 3 so that the contents of the pail will not be permitted to splash outwardly between the margin 4 and the bead 3. The plate 1 is provided with an upstanding arcuate inner flange 6 and said plate is also, immediately rearwardly of said upstanding flange 6, pressed to provide a depressed groove 7. Immediately rearwardly of the groove 7, the plate 1 is pressed outwardly to define a reinforcing bead 8. The flange 6, the groove 7 and the beads 8 and 5 cooperate to provide reinforcement for the plate so that bending will be largely prevented. As stated in the objects of the invention, the plate is particularly adapted for protecting the wearing apparel of the milker holding the pail between his legs during the milking operation. The upstanding flange 6, the groove 7, and the bead 8, will cooperate, in addition to providing reinforcement, to conduct an excess amount of milk, which may have gathered on the upper surface of the plate, to flow over the edge of the pail and to the ground so that danger of soiling the clothes of the milker will be largely eliminated. Furthermore, as the milk is conducted over the edge of the pail, such milk will not be permitted to enter the pail and mingle with the milk already in the pail. It will be seen, therefore, that the danger of contamination of the milk will be largely prevented.

Riveted, or otherwise secured, to the margin 4, immediately rearwardly of the flange 6, are preferably two spring clips which are indicated in general by the numeral 9. Inasmuch as the clips are identical in construction, a description of one will suffice for both. The spring clips are provided with a flat portion 10 which is secured to the inner extremity of the margin 4 with its inner end abutting the bead 5. The clip is bowed upwardly medially of the width of the margin 4 and then is bent to a substantially circular shape, as indicated by the numeral 11 so that the clip will clear the outer edge of the margin. As best seen in Figure 3 of the drawing, the free end of the clip is adapted to engage under the bead 3. The clips are preferably formed from flat strips of spring steel and are of sufficient strength to withstand all normal wear, and as will be observed, the clips will retain the forward portion of the plate in close abutting relation to the bead 3. As the clips are of such formation that the bowed portion 11 clears the outer edge of the margin 4, the clip will tend to retain the margin in close abutting relation to the bead, even when the plate is shifted axially on the pail. In other words, the clips will resiliently connect the margin with the bead so that lateral shifting of the plate may be effected.

Mounted on the margin 4 of the plate, medially between the clips 9, is a strip 12 which is preferably formed of sheet metal and is provided with a depending tongue 13. The tongue 13, as best seen in Figures 2 and 4 of the drawing, is adapted to overhang the outer edge of the bead 3. Overlying the strip 12 is a latch mounting plate 14 which is rolled at its outer edge to form a hinge loop 15. The hinge loop is, as best seen in Figure 4, disposed directly above the free edge of the margin 4. The plate 14 and the strip 12 are secured to the margin 4 by means of rivets 16. Swingingly connected with the loop 15 of the latch mounting plate 14 is a latch handle 17 which is provided with an upturned outer end portion 18 to facilitate manual engagement. The latch handle is provided at its inner end with a cut-out portion which is rolled to form a loop 19 which is pressed upwardly and away from the plane of the handle 17. Loops, which are slightly bent downwardly, are indicated by the numeral 20, and the loops 20 are hingedly connected to the loop 15 by means of a hinge pin 21. Hingedly connected with the loop 19 is a latch member 22 which is stamped to define loops 23 and 24 which straddle the loop 19. The latch member is hingedly connected to the loop 19 by means of a hinge pin 25. As best seen in Figure 4 of the drawing, the latch member 22 is provided with a curved lower end portion 26 which is adapted to engage beneath the bead 3 of the pail 2. The latch member 22 will overhang the depending tongue 13. As indicated in dotted lines, the tongue may be bent outwardly for controlling grip of the latch member on the bead. Also the depending tongue 13 provides a stop for the handle 17, as when said handle is swung upwardly, the loop 19 will be swung into engagement with the tongue 13 and will therefore limit downward travel of said handle. The depending tongue 13, as stated, may be bent so that the device may be utilized on pails of slightly varying sizes. It should be stated, in this connection, that the formation of the clips 9 is such that the margin 4 will be permitted to seat upon pails of different sizes.

In use, after the device is placed on a pail, the spring clips 9 will engage beneath the bead 3 and will retain the device in firm position on the pail. The curved lower end portion 26 of the latch member 22 will be engaged beneath the bead 3. The handle 17 will be positioned vertically during this operation. After the portion 26 has been seated beneath the bead, the handle 17 is swung inwardly to overlie the margin 4 of the plate and project above the concavo-convex portion thereof. When this is done the latch member is slightly raised for clamping the plate on the pail. The clips 9 will prevent rearward lateral movement of the device on the pail and the latch will, when in latched position, prevent forward lateral movement of the device, and both of said clips and said latch will cooperate for preventing upward movement of the device, so that it will be seen that the device is firmly anchored in position on the pail. When it is desired to remove the device, the handle 17 is swung rearwardly and upwardly for disengaging the portion 26 of the latch member 22 so that forward lateral movement, with consequent disengagement of the spring clips 9, will be permitted. The removal of the device will then be permitted.

The flange 6 will not only serve to provide reinforcement for the forward arcuate edge of the plate, but will also prevent foreign substances from entering the pail. By closely observing Figure 1, it will be seen that the corners of the plate connecting the opposite ends of the arcuate edge with the circumference slightly project outwardly and over the edge of the pail. This construction is necessary and advantageous to permit foreign matter, flowing from the top of the plate in the groove 7, to clear the bead and thus be prevented from entering the pail or flowing against the milker's clothing. It will be understood that the flange 6 will cooperate with the bead 5, the bead 8 and the groove 7 for effectually reinforcing the plate so that bending of said plate out of line will be largely prevented. A firm seating of the margin on the bead 3 of the pail will, therefore, be insured.

It is emphasized that, when the pail is held between the legs during a milking operation, danger of spattering of milk on the clothes of the milker will be eliminated.

When my improved device is used with a strainer, it may be adapted thereto in such an easy manner that effectual straining of the milk, with negligible loss thereof will be permitted.

It is believed that from the foregoing description it will be seen that I have provided a highly sanitary and very effective milk pail cover which will effectually protect the garments of the milker and which will, at the same time, prevent milk on the lid from flowing into the pail so that danger of contamination of the milk in the pail will be largely obviated.

Having thus described my invention, I claim:

1. A cover for a milk pail comprising a crescent shaped plate having a substantially semi-circular peripheral edge and an arcuate chordal edge, end portions of the peripheral edge being flared outwardly from a true circular path to provide extended corner portions for extending outwardly from sides of a pail when the cover is set in place upon the pail, a flange extending upwardly along the chordal edge of said plate with its end intersecting ends of the peripheral edge, said plate having a concavo-convexed portion bordered by a substantially flat marginal portion having the peripheral edge of the plate as its outer edge, an upstanding bead being provided along the intersection of the concavo-convexed portion and marginal portion with its ends abutting the upstanding flange, the cancavo-convexed portion being formed with an upstanding bead in spaced parallel relation to said flange and between the flange and bead being depressed to form an external groove, the groove, flange and beads serving to reinforce the plate and the groove also serving to direct milk spattered over the flange toward extended corners of the cover, and means carried by the flat marginal portions of the plate for detachably holding the cover in place upon a pail.

2. A cover for a milk pail comprising a plate having a concavo-convexed portion and a substantially flat marginal portion bordering the concavo-convexed portion, an upstanding bead being interposed between the marginal portion and concavo-convexed portion, a strip mounted on the marginal portion and having a tongue depending from its outer portion of a length to extend downwardly against the bead of a pail when the cover is in place, a mounting plate overlying said strip, a handle pivoted to said mounting plate, and a latch pivoted to said handle and being of a length to extend downwardly below said tongue to engage under the bead of a pail, said tongue being bendable away from the bead of the pail for engaging the latch and controlling grip of the latch on the bead of the pail.

3. A cover for a milk pail comprising a plate having a substantially flat marginal portion, a mounting plate secured flat upon the marginal portion of the cover radially thereof, said mounting plate having a hinge ear at its outer end, a handle having hinge ears at one end straddling the hinge ear of said mounting plate, a pin extending through the hinge ears of the mounting plate and handle to pivotally connect the handle with the mounting plate, a tongue carried by said handle between its hinge ears and resting upon the hinge ear of the mounting plate, and a latch consisting of a strip of resilient material pivoted at one end to the tongue of said handle and being curved longitudinally to provide the latch with a longitudinally curved shank portion merging into an arcuate bill.

FRANK W. MOORE.